(12) United States Patent
Scholtz (10) Patent No.: US 7,336,883 B2
(45) Date of Patent: Feb. 26, 2008

(54) INDEXING OPTICAL FIBER ADAPTER (75) Inventor: Jan Scholtz, Halstead (GB)

(73) Assignee: Stratos International, Inc., Chicago, IL (US)

( * ) Notice: Subject to any disclaimer, the term of this patent is extended or adjusted under 35 U.S.C. 154(b) by 78 days.

(21) Appl. No.: 11/222,463

(22) Filed: Sep. 8, 2005

(65) Prior Publication Data

US 2007/0053644 A1   Mar. 8, 2007

(51) Int. Cl.
G02B 6/00 (2006.01)
G02B 6/43 (2006.01)

(52) U.S. Cl. .................................. 385/134; 385/89

(58) Field of Classification Search ............... None
See application file for complete search history.

(56) References Cited

U.S. PATENT DOCUMENTS

| | | | | |
|---|---|---|---|---|
| 4,678,264 A * | 7/1987 | Bowen et al. | ............... | 385/89 |
| 4,972,050 A | 11/1990 | Hammond et al. | ......... | 174/251 |
| 5,206,626 A | 4/1993 | Minasy et al. | ............. | 340/572 |
| 5,233,674 A | 8/1993 | Vladic | ......................... | 385/56 |
| 5,448,110 A | 9/1995 | Tuttle et al. | ................ | 257/723 |
| 5,473,715 A | 12/1995 | Schofield et al. | ............ | 385/53 |
| 5,481,634 A | 1/1996 | Anderson et al. | ............ | 385/76 |
| 6,118,379 A | 9/2000 | Kodukula et al. | ....... | 340/572.8 |
| 6,147,655 A | 11/2000 | Roesner | ..................... | 343/741 |
| 6,424,263 B1 | 7/2002 | Lee et al. | ............... | 340/572.7 |
| 6,429,831 B2 | 8/2002 | Babb | .......................... | 343/895 |
| 6,445,297 B1 | 9/2002 | Nicholson | ............... | 340/572.7 |
| 6,451,154 B1 | 9/2002 | Grabau et al. | ............. | 156/300 |
| 6,677,917 B2 | 1/2004 | Van Heerden et al. | ...... | 343/897 |
| 6,784,802 B1 | 8/2004 | Stanescu | .................... | 340/687 |
| 6,971,895 B2 * | 12/2005 | Sago et al. | ................. | 439/188 |
| 2005/0226626 A1 * | 10/2005 | Zhang et al. | ............... | 398/135 |

OTHER PUBLICATIONS

U.S. Appl. No. 11/012,504, Durant et al.
U.S. Appl. No. 11/183,525, Scholtz.

* cited by examiner

*Primary Examiner*—Rodney Bovernick
*Assistant Examiner*—Omar Rojas
(74) *Attorney, Agent, or Firm*—Karl D. Kovach (57) ABSTRACT The device includes an indexing adapter, two port monitors, a light source, and two fiber optic connectors. The indexing adapter has only three fiber optic connector receptacles. Two of the three fiber optic connector receptacles are situated adjacent to the third fiber optic connector receptacle. The third or center fiber optic connector receptacle separates the other two fiber optic connector receptacles from being positioned adjacent to one another. The center fiber optic connector receptacle is optically associated with the light source. Each of the other two fiber optic connector receptacles is respectively associated with one of the two port monitors. Each of the two fiber optic connectors includes only one optical fiber. The two fiber optic connectors are mechanically associated with one another.

19 Claims, 5 Drawing Sheets

INDEXING OPTICAL FIBER ADAPTER

BACKGROUND OF THE INVENTION

1. Field of the Invention

The present invention pertains to fiber optic testing devices. The invention more particularly concerns the testing of a duplex fiber optic connector where each optical fiber of the duplex fiber optic connector is tested one at a time by a single fiber optic connector receptacle.

2. Discussion of the Background

Testing of optical connectors is important so that the user of the fiber optic connector knows the characteristics of the fiber optic connector and its associated optical fiber. Such characteristics include the attenuation loss and insertion loss of the fiber optic connector. These characteristics are then used to choose appropriate components during the design phase of a fiber optic based system.

One known testing apparatus tests one optical fiber at a time. The testing apparatus includes a single ferrule receiving bore for receiving the ferrule of the fiber optic connector. Once the testing is completed, the test data of each fiber optic connector is recorded by the test equipment and often is input manually by an operator into a computer or is recorded manually on a sheet of paper, and, at best, the test results are stored on the test equipment and linked to a serial number which might exist or not on the tested connector by means of a label attached to the connector. The testing of duplexed fiber optic connectors poses a special problem since each connector of the duplexed connectors is tested individually, thus two sets of test results will be obtained, in the case of a duplex connector. It is crucial to separate and link the correct test information to the correct fiber being tested. Once the first fiber optic connector of the duplexed fiber optic connectors is tested, the one fiber optic connector is removed from the ferrule receiving bore of the testing apparatus. Then the second fiber optic connector of the duplexed fiber optic connectors is inserted into the ferrule receiving bore of the testing apparatus and tested. The operator then records the data. Hopefully the operator enters the correct data for the respective fiber optic connectors, and when the operator inserted the second fiber optic connector of the duplexed fiber optic connectors, hopefully, the operator did not accidentally re-insert and re-test the first fiber optic connector of the duplex fiber optic connectors, nor forget to mark such connector with the correct serial number or other identifier of the tested connector.

One type of testing apparatus is disclosed in U.S. patent application Ser. No. 11/012,504, now U.S. Pat. No. 7,165, 728, and one type of data reading and recording apparatus is disclosed in U.S. patent application Ser. No. 11/183,525. Both U.S. patent application Ser. Nos. 11/012,504, now U.S. Pat. No. 7,165,728, and 11/183,525 are hereby incorporated herein by reference. Both patent applications utilize radio frequency identification devices (RFID). Typically, radio frequency identification systems incorporate an antenna or coil, a transceiver (with decoder), and a transponder (RE tag). Often times the antenna and the transceiver are packaged together so as to form a reader or interrogator. The transponder includes a transponder antenna and an integrated circuit chip attached to the transponder antenna. The antenna or coil emits a radio wave which induces an electrical current in the antenna of the transponder. The electrical current then activates the integrated circuit chip of the transponder. The integrated circuit chip can then transmit information through the antenna of the transponder via radio waves back to the antenna or coil. Information can be stored on the integrated circuit as either read only memory or read/write memory.

Radio frequency identification devices can be either active or passive. An active system includes a transponder which contains its own power source. In contrast, in a passive system the transponder obtains the energy from the radio waves emanating from the antenna or coil so as to enable the transponder to operate and transmit information. A transponder operating in accordance with the active system is able to transmit information to the antenna or coil over a greater distance than is a transponder operating in accordance with the passive system. However, the transponder operating in accordance with the active system is larger than the transponder operating in accordance with the passive system. Furthermore, typical transponders operating in accordance with the passive system contain integrated circuit chips that have read only memory. Examples of radio frequency identification components are presented in U.S. Pat. Nos. 5,206,626; 5,448,110; 6,118,379; 6,147,655; 6,424,263; 6,429,831; 6,445,297; 6,451,154; and 6,677,917. U.S. Pat. Nos. 5,206,626; 5,448,110; 6,118,379; 6,147,655; 6,424,263; 6,429,831; 6,445,297; 6,451,154; and 6,677,917 are hereby incorporated herein by reference.

Connectors and panels or patch panels are also known in the art. Known connectors include fiber optic connectors and electrically conductive connectors. U.S. Pat. Nos. 5,233, 674, and 5,481,634 disclose a fiber optic cable having a fiber optic connector. U.S. Pat. Nos. 5,233,674, and 5,481,634 are hereby incorporated herein by reference. The fiber optic cable disclosed in U.S. Pat. No. 5,481,634 includes a fiber optic connector. Attached to the fiber optic connector is a strain relief boot. Formed as part of the optic connector is a release lever. The fiber optic connector disclosed therein conforms to the LC style of fiber optic connectors.

Thus, there is a need for the accurate recordation of test data concerning duplexed fiber optic connectors having optical fibers.

SUMMARY OF THE INVENTION

It is an object of the invention to provide a device which facilitates the testing of duplexed fiber optic connectors.

It is another object of the invention to provide a device which facilitates the recordation of test data associated with duplexed fiber optic connectors.

In one form of the invention the device includes an indexing adapter, a first port monitor, a second port monitor, a first fiber optic connector, a second fiber optic connector, and a light source. The indexing adapter has only three fiber optic connector receptacles, a first fiber optic connector receptacle, a second fiber optic connector receptacle, and a third fiber optic connector receptacle. The second fiber optic connector receptacle is adjacent to the first fiber optic connector receptacle. The third fiber optic connector receptacle is adjacent to the second fiber optic connector receptacle, and the third fiber optic connector receptacle is separated from the first fiber optic connector receptacle by the second fiber optic connector receptacle. The first port monitor is associated with the first fiber optic connector receptacle. The second port monitor is optically associated with the third fiber optic connector receptacle. The light source is optically associated with the second fiber optic connector receptacle. The first fiber optic connector has only a first optical fiber. The second fiber optic connector has only a second optical fiber. The second fiber optic connector is mechanically associated with the first fiber optic connector. In a first position of the device, the first fiber optic connector is plugged into the first fiber optic connector receptacle, and the second fiber optic connector is plugged into the second fiber optic connector receptacle so that the second optical fiber of the second fiber optic connector is optically associated with the light source. In a second position of the device, the first fiber optic connector is plugged into the second fiber optic receptacle so that the first optical fiber of the first fiber optic connector is optically associated with the light source, and the second fiber optic connector is plugged into the third fiber optic connector receptacle.

Thus, the invention achieves the objectives set forth above. The invention provides a device which reliably tests, one at a time, a first discrete fiber optic connector of the duplexed fiber optic connectors, and then a second fiber optic connector of the duplexed fiber optic connectors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Referring now to the drawings, wherein like reference numerals designate identical or corresponding parts throughout the several views, and more particularly to FIGS. 1-7 thereof, embodiments of the present invention is displayed therein.

Figure 1:
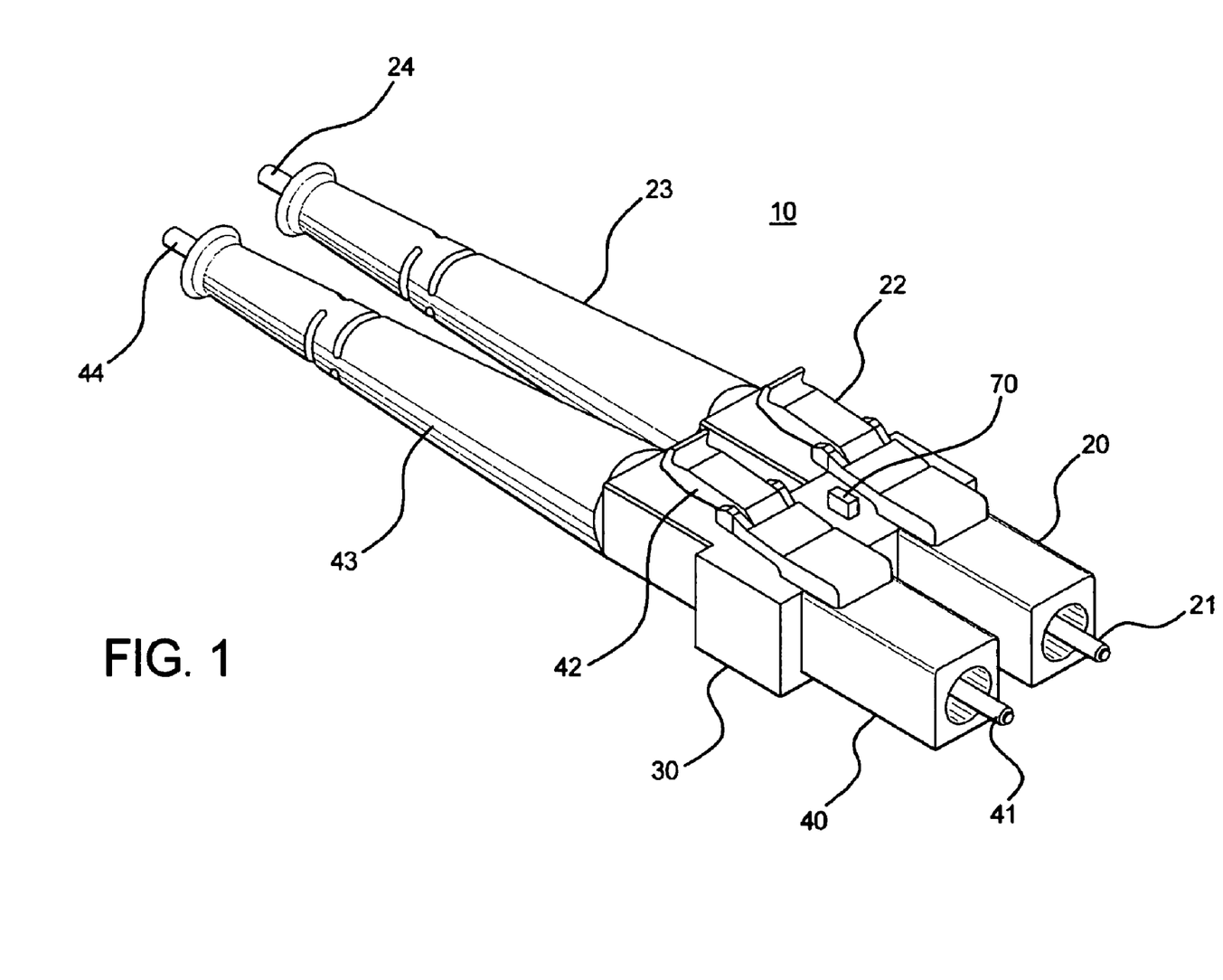
FIG. 1 is a perspective view of two fiber optic connectors that are duplexed together.

FIG. 1 is a perspective view of a first fiber optic connector 20 attached to a second fiber optic connector 40 so as to form a duplex fiber optic connector 10. The first fiber optic connector 20 can be integrally molded with the second fiber optic connector 40, or as shown in FIG. 1, a clip 30 can be used to secure the first fiber optic connector 20 to the second fiber optic connector 40. The clip 30 can be attach to the first and second fiber optic connectors 20, 40 by way of an interference fit, or adhesive, or may be overmolded or embodied by a connector shell to form a single-body duplex connector. The first fiber optic connector 20 includes a ferrule 21 which holds an optical fiber, a latching mechanism 22, a strain relief boot 23, and a fiber optic cable 24. The second fiber optic connector 40 includes a ferrule 41 which holds an optical fiber, a latching mechanism 42, a strain relief boot 43, and a fiber optic cable 44. Also attached to, or mounted on or in, the clip 30 is a transponder 70. Thus, the transponder is attached to the first fiber optic connector 20 and the second fiber optic connector 40 via the clip 30. The transponder 70 can be affixed to the clip 30 with an adhesive material or be overmolded into the clip 30, or even be attached to one of the first fiber optic connector 20 and the second fiber optic connector 40.

The first and second fiber optic connectors 20, 40 generally conform to the LC standard, however, the fiber optic connector can also be constructed to conform to any other standard such as SC, ST, and MU. The ferrules 21, 41 are single fiber ferrules, however multi-fiber ferrules and connectors can also be employed. Additionally, the fiber optic connector can be of its own unique design. Furthermore, the optical fibers terminated at ferrules 21, 41 can be any one of a single mode fiber, a multimode fiber, a polarization maintaining fiber, or any other type of optical fiber.

Figure 2:
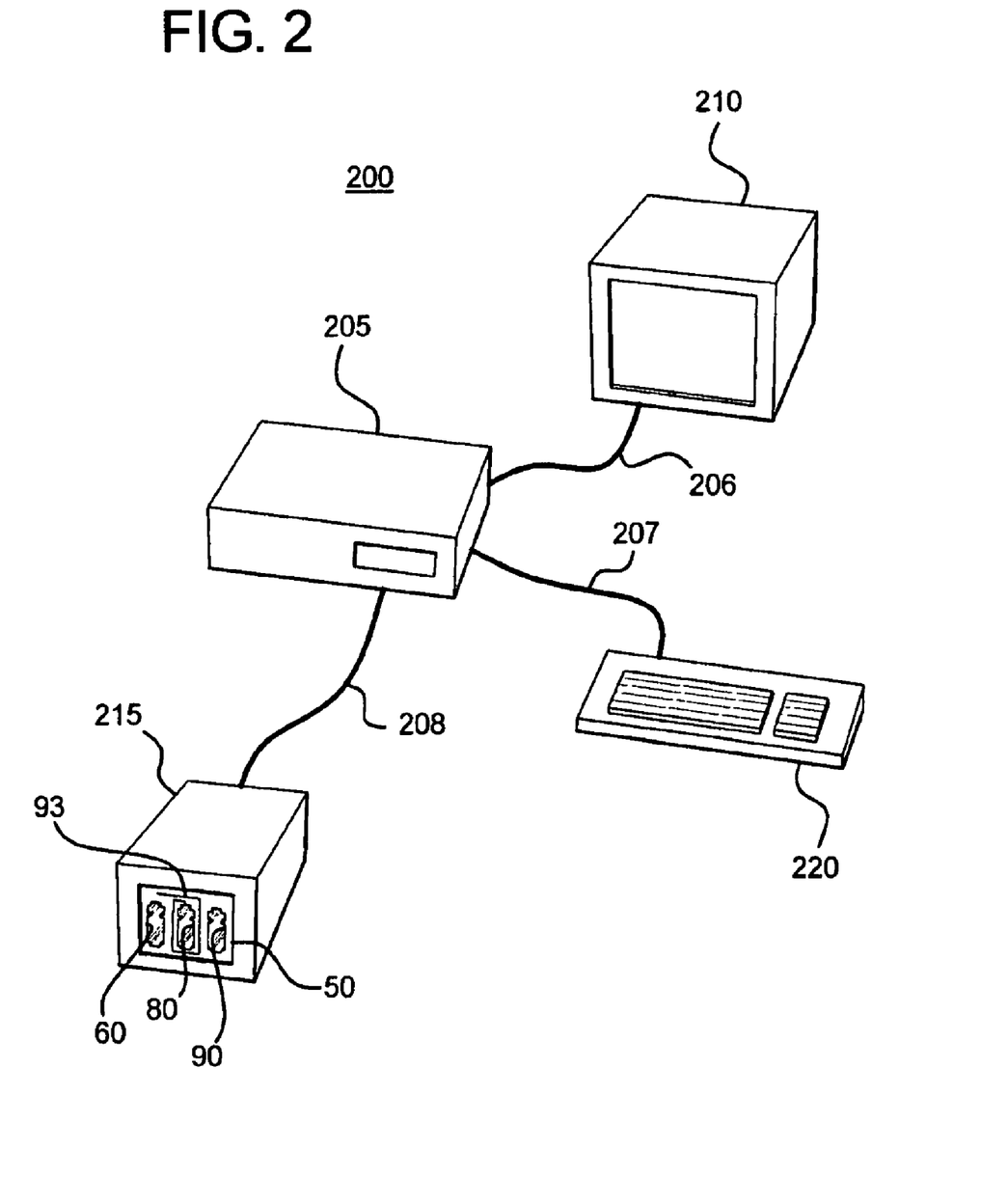
FIG. 2 is a perspective view of a system including a reader/writer or interrogator, a computer having a central processing unit, a monitor, and a keyboard.

FIG. 2 is a perspective view of an interrogator 200. The interrogator 200 includes a computer 205 having a central processing unit (CPU), an optional monitor 210, an input device 220, and a reader/writer 215 having an indexing adapter 50. The indexing adapter 50 includes a first fiber optic connector receptacle 60, a second fiber optic connector receptacle 80, and a third fiber optic connector receptacle 90. The input device 220 can be a keyboard (as shown), a card reader, or some other data input device. The reader/writer 215 houses the antenna 93 and transceiver 102 (see FIG. 3). The input device 220 is in communication with the computer 205 via an electrical cable 207. The monitor 210 is in communication with the computer 205 via an electrical cable 206. The reader/writer 215 is in communication with the computer 205 via an electrical cable 208. The computer 205 helps to coordinate the activities of the various peripherals. Also, the computer 205 can store necessary information which can later be transferred to the reader/writer 215. The monitor 210 is not required, but may be used to ease the users verification of input and output information or data. The authorized interrogator 200, as shown in FIG. 2, may take the form of a hand held device, where many of the components of the authorized interrogator 200 are merged or integrated with one another.

The coil or antenna 93 surrounds the aperture 80. The coil or antenna 93 is made of a suitable electrically conductive material such as copper. The coil or antenna 93 is adhered to the surface of the reader/writer 215 or is attached to a substrate for mounting to the reader/writer 215. Typically, the coil or antenna 93 is attached to the substrate with an adhesive material. The antenna 93 can also be attached directly to the adapter 50 of the reader/writer 215. The substrate is typically made of non-conductive or insulative materials such as mylar or other suitable polymer materials. U.S. Pat. No. 4,972,050 discloses a method of constructing a substrate, where the substrate includes conductive paths such as coils or antennas. U.S. Pat. No. 4,972,050 is hereby incorporated herein by reference.

Figure 3:
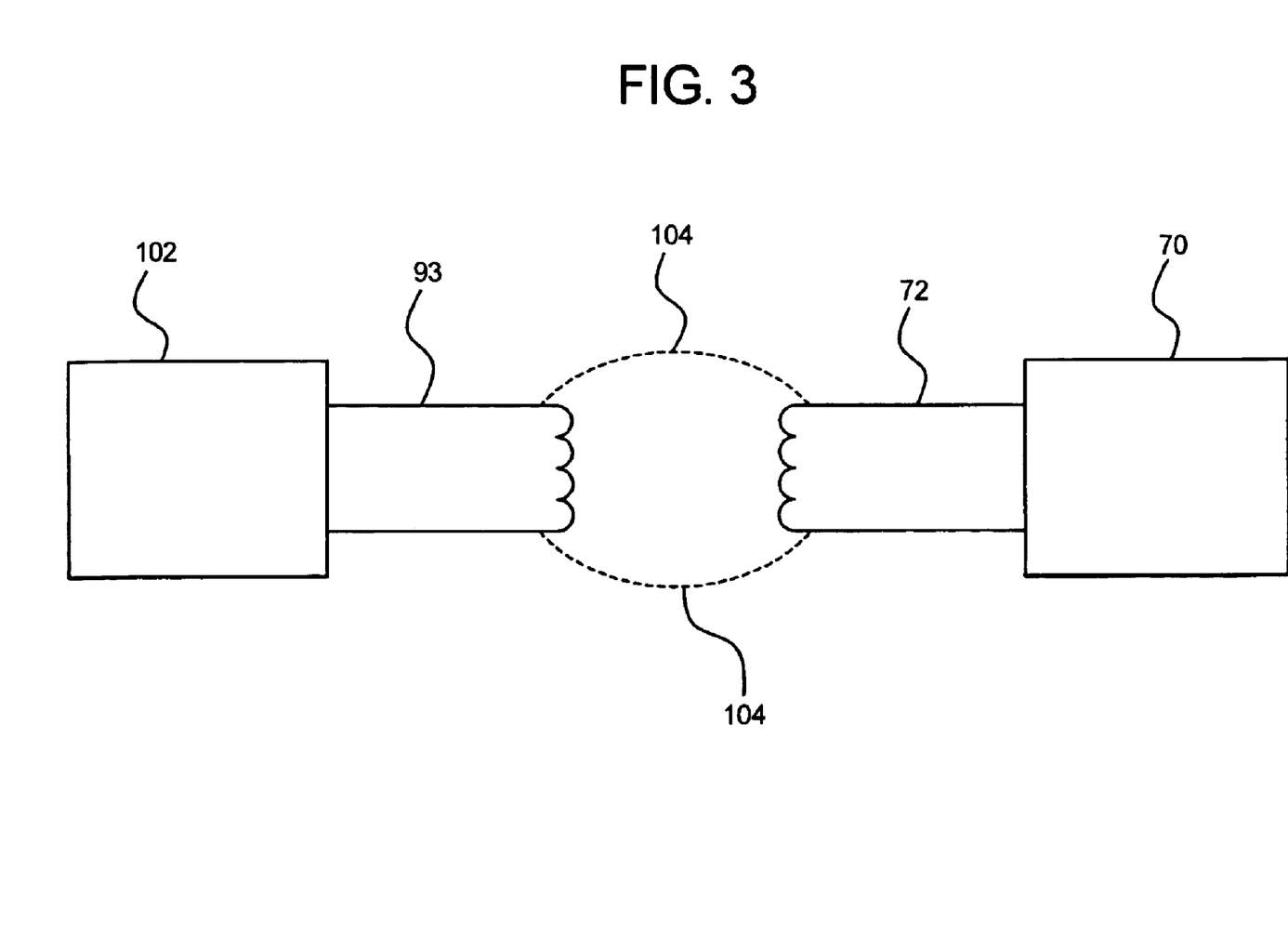
FIG. 3 is an electrical schematic of the electromagnetic interaction between the transponder and the reader/writer.

FIG. 3 is an electrical schematic of the electro-magnetic interaction between the transponder 70 and the antenna 93 and transceiver 102 of the reader/writer 215. Once the transponder 70 is energized by the power from the transceiver 102, the transponder sends information, which was previously stored on its integrated circuit chip, to the transceiver 102 via radio waves 104. The radio waves leave the transponder antenna 72 and are received by the antenna or coil 92. The induced electrical signal is then carried to the transceiver 102 for storage or manipulation of the data supplied by the transponder 70. Data may also be imparted on the transponder from the reader/writer 215, and, likewise, data may be imparted on the transceiver from the transponder.

Figure 4:
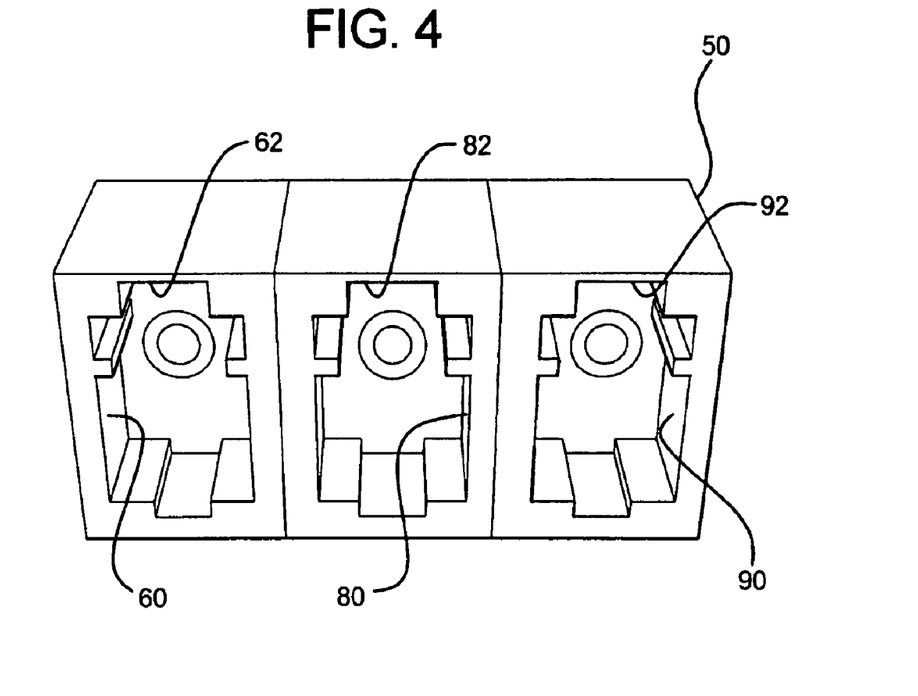
FIG. 4 is a perspective view of a portion of the reader/writer of FIG. 2 which details an indexing adapter comprised of three optical receptacles.

FIG. 4 is a perspective view of the indexing adapter 50. The indexing adapter 50 includes the first fiber optic connector receptacle 60, the second fiber optic connector receptacle 80, and the third fiber optic connector receptacle 90. The first fiber optic connector receptacle includes a latching mechanism 62 that is compatible with the latching mechanism 22 of the first fiber optic connector 20. The second fiber optic connector receptacle 80 includes a latching mechanism 82 that is compatible with and complimentary to the latch mechanism 22 of the first fiber optic connector 20, and the latch mechanism 42 of the second fiber optic connector 40. The third fiber optic connector receptacle 90 includes a latching mechanism 92 that is compatible with and complimentary to the latching mechanism 42 of the second fiber optic connector 40. The first, second, and third fiber optic connector receptacles 60, 80, and 90 are designed to receive fiber optic connectors that generally comply with the LC standard.

Figure 5:
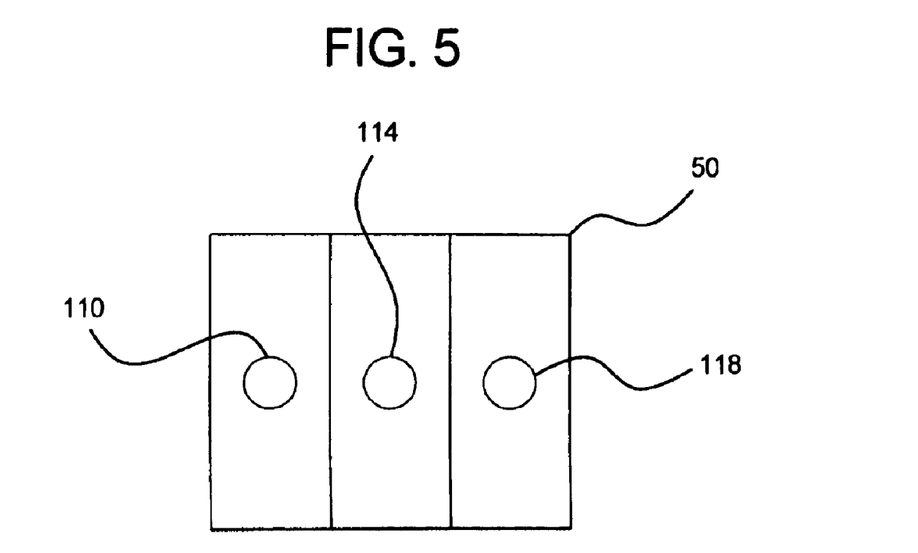
FIG. 5 is a back view of the adapter of FIG. 4.

FIG. 5 is a back side view of the indexing adapter 50. A first port monitor 118 is associated with the first fiber optic connector receptacle 60. A second port monitor 110 is associated with the third fiber optic connector receptacle 90. A light source 114 is optically associated with the second fiber optic connector receptacle 80. The light source 114 can be a calibrated vertical cavity surface emitting laser. In this embodiment, the first port monitor 118 is a first photodetector that is optically associated with the first fiber optic connector receptacle 60, and the second port monitor 110 is a second photodetector that is optically associated with the third fiber optic connector receptacle 90.

Figure 6:
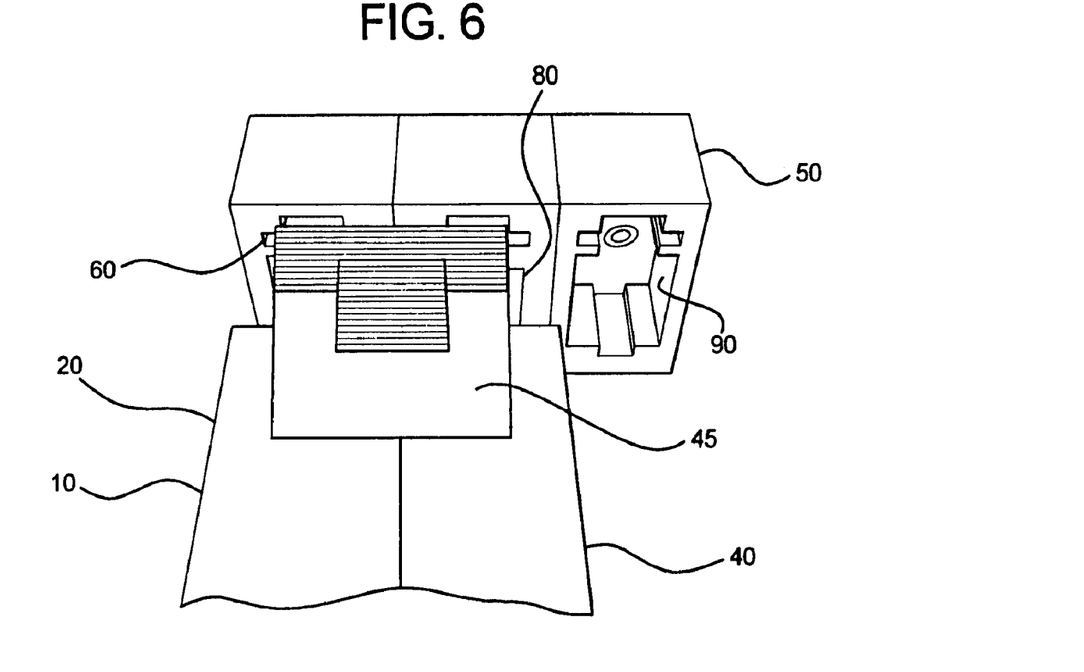
FIG. 6 is a perspective view of the duplexed fiber optic connectors of FIG. 1 inserted, in a first position, into the adapter of FIG. 4.

FIG. 6 is a perspective view of the duplex fiber optic connector 10 plugged into the adapter 50. Note that in FIG. 6, the latching mechanisms 22, 42 of the duplex fiber optic connector 10 FIG. 1 have been integrated into a single latching mechanism 45 utilized by both connectors 20, 40. The first fiber optic connector 20 is plugged into the first fiber optic connector receptacle 60, and the second fiber optic connector 40 is plugged into the second fiber optic connector receptacle 80. In practice, once the duplex fiber optic connector 10 is plugged into the adapter 50, the testing can proceed.

In the set up presented in FIG. 6, the second fiber optic connector 40 and its associated optical fiber are being tested. The second photodetector 110 associated with the third fiber optic connector receptacle 90 detects light since no fiber optic connector is plugged into the receptacle 90 which allows the ambient light to enter the receptacle 90 and thus is sensed by the second photodetector 110. The first photodetector 118 associated with the first fiber optic connector receptacle 60 does not detect light since the first fiber optic connector 20 is plugged into the receptacle 60 thus blocking the ambient light from entering the receptacle 60. Electrical signals generated by the photodetectors 118, 110 are transmitted to the CPU where a table look up occurs, and the system 200 knows that the second fiber optic connector 40 is ready for testing. Then, the light source 114 is activated so at to perform the desired tests. Tests can include the insertion loss of the second fiber optic connector 40 and the attenuation loss of the optical fiber of the second fiber optic connector 40. Tests can also include the timing of a light signal to traverse the length of the optical fiber so as to determine its length, and the optical grade of the optical fiber can be determined. If necessary, a third photodetector (not shown) is placed at the second end of the optical fiber of the second fiber connector 40 so as to measure the amount of light exiting the optical fiber. The data from the third photodetector is then also input to the CPU and stored in the computer. The collected test data is then transmitted to the reader/writer 215 and the data is deposited on the transponder 70 through the antenna 93.

Figure 7:
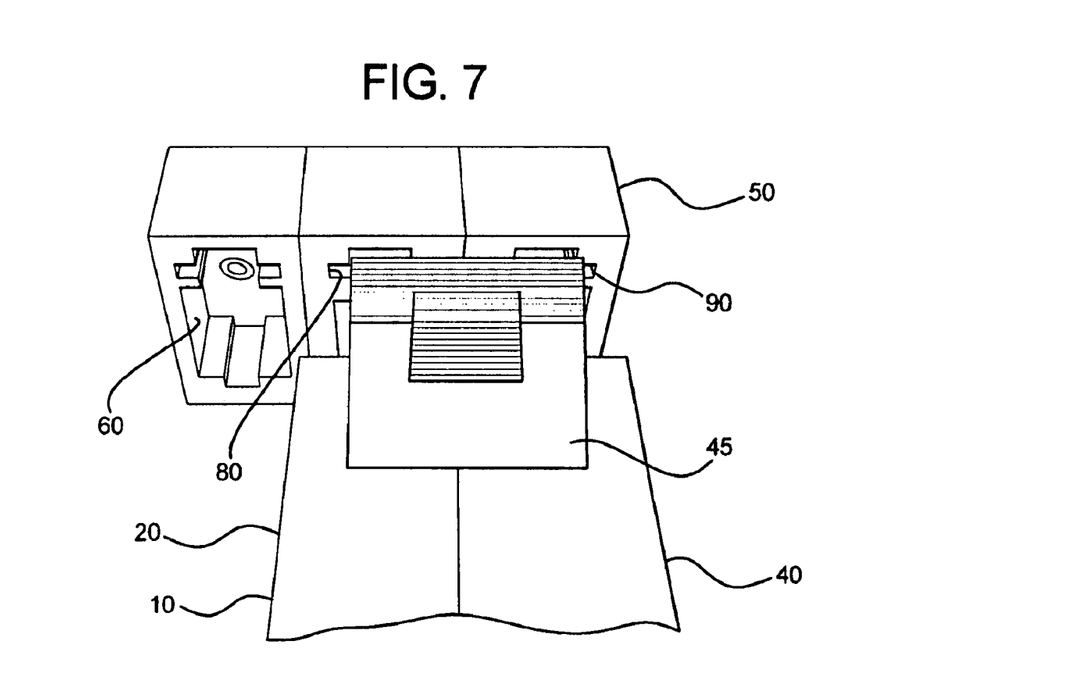
FIG. 7 is a perspective view of the duplexed fiber optic connectors of FIG. 1 inserted, in a second position, into the adapter of FIG. 4.

Once the second fiber optic connector 40 has been tested, the duplex fiber optic connector 10 is removed form the adapter and indexed over one receptacle, as shown in FIG. 7. The duplex fiber optic connector 10 can not be inserted into the adapter 50 upside down due to the presence of the locking mechanisms 45, 62, 82, 92 which act as a keying device. The first fiber optic connector 20 is plugged into the second fiber optic connector receptacle 80, and the second fiber optic connector 40 is plugged into the third fiber optic connector receptacle 90. In practice, once the duplex fiber optic connector 10 is plugged into the adapter 50, the testing can proceed.

In the set up presented in FIG. 7, the first fiber optic connector 20 and its associated optical fiber are being tested. The first photodetector 118 associated with the first fiber optic connector receptacle 60 detects light since no fiber optic connector is plugged into the receptacle 60 which allows the ambient light to enter the receptacle 60 and thus is sensed by the second photodetector 118. The second photodetector 110 associated with the third fiber optic connector receptacle 90 does not detect light since the second fiber optic connector 40 is plugged into the receptacle 90 thus blocking the ambient light from entering the receptacle 90. Electrical signals generated by the photodetectors 118, 110 are transmitted to the CPU where a table look up occurs, and the system 200 knows that the first fiber optic connector 20 is ready for testing. Then, the light source 114 is activated so at to perform the desired tests. Tests can include the insertion loss of the first fiber optic connector 20 and the attenuation loss of the optical fiber of the first fiber optic connector 20. Tests can also include the timing of a light signal to traverse the length of the optical fiber so as to determine its length, and the optical grade of the optical fiber can be determined. If necessary, a fourth photodetector (not shown) is placed at the second end of the optical fiber of the first fiber connector 20 so as to measure the amount of light exiting the optical fiber. The data from the fourth photodetector is then also input to the CPU and stored in the computer. The collected test data is then transmitted to the reader/writer 215 and the data is deposited on the transponder 70 through the antenna 93.

A user at the keyboard 220 can control the computer and review test data on the monitor 210. Also, before the testing is completed, the test data can be read off of the transponder 70 by the antenna 93 and verified against the test data stored in the computer. Thus, this step ensures that the test data stored on the transponder 70 is correct. Once the test is complete, the duplex fiber optic connector 10 can be removed from the adapter 50.

Therefore, due to the structure of the adapter 50, the adapter 50 keeps the duplex optical connector 10 oriented with the locking mechanisms 22, 42, or 45 oriented adjacent to either the locking mechanisms 62, 82 or 82, 92 depending on which fiber optic connector is being tested. And then, the photodetectors 118, 110 determine which fiber optic connector receptacle is vacant, thus, the computer knows which fiber optic connector is being tested while occupying fiber optic connector receptacle 80. Thus, the invention provides a device which reliably tests, one at a time, a first discrete fiber optic connector of the duplexed fiber optic connectors, and then a second fiber optic connector of the duplexed fiber optic connectors by removing the duplex connector from a first position, thus occupying the first fiber optic connector receptacle and the second fiber optic connector receptacle, and moving it to a second position, thus occupying the second fiber optic connector receptacle and the third fiber optic connector receptacle for the second test. However, due to the port monitoring feature, test results are also interlocked through the port monitoring feature so that no confusion can be caused as to which test results relate to which fiber test. The port monitoring feature allows the device to start the testing process, and the port monitoring feature also indicates when the safe removal of a ferrule under test can occur, which is after the transponder and back-up file have been updated successfully.

In another embodiment, the first port monitor 118 is a first microswitch, and the second port monitor 110 is a second microswitch. The first microswitch has an actuator (not shown) that is mechanically associated with the first fiber optic connector receptacle 60. The second microswitch has an actuator (not shown) that is mechanically associated with the third fiber optic connector receptacle 90. When the first fiber optic connector 20 of the duplex fiber optic connector 10 is introduced into the first fiber optic connector receptacle 60, the actuator of the first microswitch is deflected thus sending an electrical signal to the CPU, and since the actuator of the second microswitch, which is associated with the third fiber optic connector receptacle 90, is not deflected, it does not send a signal to the CPU. Therefore, similar to the earlier embodiment using photodetectors, the CPU can determine which fiber optic connector is under test. Likewise, when the second test takes place, the first fiber optic connector 20 is introduced into the second fiber optic connector receptacle 80 and is optically associated with the light source 114, and the second fiber optic connector 40 is introduced into the third fiber optic connector receptacle 90 and deflects the actuator of the second microswitch which in this embodiment is the second port monitor 110. Microswitches are well known in the art and are not further discussed.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
    an indexing adapter having only three fiber optic connector receptacles, the indexing adapter includes:
        a first fiber optic connector receptacle of the only three fiber optic connector receptacles,
        a second fiber optic connector receptacle of the only three fiber optic connector receptacles, the second fiber optic connector receptacle adjacent to the first fiber optic connector receptacle, and
        a third fiber optic connector receptacle of the only three fiber optic connector receptacles, the third fiber optic connector receptacle adjacent to the second fiber optic connector receptacle, and the third fiber optic connector receptacle is separated from the first fiber optic connector receptacle by the second fiber optic connector receptacle;
    a first port monitor associated with the first fiber optic connector receptacle;
    a second port monitor associated with the third fiber optic connector receptacle;
    a light source optically associated with the second fiber optic connector receptacle;
    a first fiber optic connector, the first fiber optic connector has only a first optical fiber; and
    a second fiber optic connector, the second fiber optic connector has only a second optical fiber, and the second fiber optic connector is mechanically associated with the first fiber optic connector, and, wherein,
    in a first position of the device, the first fiber optic connector is plugged into the first fiber optic connector receptacle, and the second fiber optic connector is plugged into the second fiber optic connector receptacle so that the second optical fiber of the second fiber optic connector is optically associated with the light source, and wherein,
    in a second position of the device, the first fiber optic connector is plugged into the second fiber optic connector receptacle so that the first optical fiber of the first fiber optic connector is optically associated with the light source, and the second fiber optic connector is plugged into the third fiber optic connector receptacle.

2. A device according to claim 1, further comprising an antenna associated with the second fiber optic connector receptacle.

3. A device according to claim 2, further comprising a computer having a central processing unit, the central processing unit electrically associated with the first port monitor, the second port monitor, and the light source.

4. A device according to claim 3, further comprising a transceiver electrically connected to the antenna so as to form a reader/writer, the reader/writer in communication with the computer.

5. A device according to claim 4, further comprising a transponder mechanically associated with at least one of the first fiber optic connector and the second fiber optic connector, and wherein, in a first mode of operation, the transponder accepts information from the reader/writer when the transponder is sufficiently close to the antenna, and wherein, in a second mode of operation, the transponder delivers information to the reader/writer when the transponder is sufficiently close to the antenna.

6. A device according to claim 5 wherein the light source is a vertical cavity surface emitting laser.

7. A device according to claim 6 wherein the first optical fiber has a first length, and wherein the transponder includes information related to the first length of the first optical fiber.

8. A device according to claim 7 wherein the second optical fiber has a second length, and wherein the transponder includes information related to the second length of the second optical fiber.

9. A device according to claim 6 wherein the first optical fiber conforms to a first predetermined optical fiber grade, and wherein the transponder includes information related to the first predetermined optical fiber grade of the first optical fiber.

10. A device according to claim 9 wherein the second optical fiber conforms to a second predetermined optical fiber grade, and wherein the transponder includes information related to the second predetermined optical fiber grade of the second optical fiber.

11. A device according to claim 6 wherein the transponder includes insertion loss data of the first fiber optic connector.

12. A device according to claim 11 wherein the transponder includes insertion loss data of the second fiber optic connector.

13. A device according to claim 6 wherein the transponder includes attenuation loss data associated with the first optical fiber of the first fiber optic connector.

14. A device according to claim 13 wherein the transponder includes attenuation loss data associated with the second optical fiber of the second fiber optic connector.

15. A device according to claim 6 wherein the transponder includes back reflection data associated with the first fiber optic connector.

16. A device according to claim 15 wherein the transponder includes back reflection data associated with the second fiber optic connector.

17. A device according to claim 6 wherein the first fiber optic connector conforms to the LC standard.

18. A device according to claim 17 wherein the second fiber optic connector conforms to the LC standard.

19. A device according to claim 1 wherein the first port monitor is a first photodetector optically associated with the first fiber optic connector receptacle, and the second port monitor is a second photodetector optically associated with the third fiber optic connector receptacle.

* * * * *